US012251703B2

(12) United States Patent
Enderle et al.

(10) Patent No.: US 12,251,703 B2
(45) Date of Patent: Mar. 18, 2025

(54) AGITATOR MILL

(71) Applicant: NETZSCH-Feinmahltechnik GmbH, Selb (DE)

(72) Inventors: Udo Enderle, Arzberg (DE); Thomas Goller, Schwarzenbach/Saale (DE); Holger Möschl, Selb (DE); Witali Sudermann, Marktredwitz (DE); Lars-Peter Weiland, Schönwald (DE)

(73) Assignee: NETZCH-Feinmahltechnik GmbH, Selb (DE)

( * ) Notice: Subject to any disclaimer, the term of this patent is extended or adjusted under 35 U.S.C. 154(b) by 214 days.

(21) Appl. No.: 17/931,029

(22) Filed: Sep. 9, 2022

(65) Prior Publication Data

US 2023/0128694 A1 Apr. 27, 2023

(30) Foreign Application Priority Data

Sep. 9, 2021 (DE) ..................... 10 2021 123 408.5

(51) Int. Cl.
*B02C 17/16* (2006.01)

(52) U.S. Cl.
CPC ............ *B02C 17/163* (2013.01); *B02C 17/16* (2013.01)

(58) Field of Classification Search
CPC ..... B02C 17/16; B02C 17/161; B02C 17/163; B02C 17/166; B02C 17/18; B02C 2017/165
USPC .................................................. 241/171, 172
See application file for complete search history.

(56) References Cited

U.S. PATENT DOCUMENTS

| | | | | |
|---|---|---|---|---|
| 5,544,818 | A * | 8/1996 | Yoshida | B02C 17/166 241/29 |
| 2016/0107163 | A1* | 4/2016 | Pausch | B02C 17/163 241/30 |
| 2018/0104699 | A1* | 4/2018 | Simons | B02C 17/163 |

FOREIGN PATENT DOCUMENTS

| | | | | |
|---|---|---|---|---|
| CH | 715322 B1 * | 6/2020 | | B02C 17/16 |
| CN | 207655240 U * | 7/2018 | | B02C 17/16 |
| DE | 3431553 A1 | 3/1986 | | |
| EP | 0376001 A1 * | 7/1990 | | B02C 17/16 |
| EP | 2178643 B1 | 1/2011 | | |
| EP | 4032615 A1 * | 7/2022 | | B02C 17/16 |
| JP | 2004025168 A * | 1/2004 | | B02C 17/16 |
| WO | WO-2016184445 A1 * | 11/2016 | | B02C 17/161 |

* cited by examiner

*Primary Examiner* — Jared O Brown
(74) *Attorney, Agent, or Firm* — Whitmyer IP Group LLC

(57) ABSTRACT

An agitator mill including a grinding chamber containing grinding bodies and an agitator shaft, which revolves therein around a horizontal axis and which supports several grinding disks, which are connected thereto and which are spaced apart from one another in the direction of the horizontal axis and which move the grinding bodies, wherein grinding disks preferably in each case have slits or apertures, wherein adjacent grinding disks are arranged on the agitator shaft so that the ratio of the grinding chamber length to the radial grinding chamber height is greater than or equal to 2:3, and that the radial distance between the outer jacket surface of the grinding disks and the inner wall of the grinding container limiting the grinding chamber is more than 20% of the radial grinding chamber height.

5 Claims, 4 Drawing Sheets

AGITATOR MILL

TECHNICAL FIELD

The invention relates to an agitator mill comprising a grinding chamber containing grinding bodies, an agitator shaft, and several agitator bodies according to the preamble of the claims.

BACKGROUND

The basic principle of an agitator mill, also referred to as agitator ball mill, will initially be described by means of FIG. 1. An agitator mill 1 comprising a horizontal agitator shaft 3 is illustrated schematically in FIG. 1. The illustration of the grinding bodies, which are located in the grinding container 2 and which are generally embodied as steel or ceramic balls, was forgone. Via the inlet 5, the material to be ground is pumped into or through, respectively, the grinding chamber 7, which is enclosed by the grinding container 2 during the operation of the agitator mill 1. The material to be ground is usually a suspension of water and solids.

The agitator bodies 8, which are often also referred to as grinding disks and which are connected in a rotationally fixed manner to the agitator shaft, are set in rotation by means of a rotational movement of the agitator shaft 3. Sleeve-like agitator shaft bushings 12 are often attached to the agitator shaft 3, in particular between the agitator bodies 8, which are not shown explicitly figuratively, as spacer of the agitator bodies 8 and protection for the agitator shaft 3, among other things.

To generate the rotational movement, the agitator shaft 3 can be driven by an electric motor 9, for example via a belt drive 10. The drive of the agitator mill 1 is thereby mostly located in a housing 11 adjoining the grinding container 2.

The grinding bodies, which are located in the grinding chamber 7 and which are located in the vicinity of the agitator bodies 8, are moved in the direction of the grinding container 2 by means of the rotation of the agitator bodies 8. In the central region between two respective agitator bodies 8, the moved grinding bodies move from the grinding container 2 back in the direction of the agitator shaft 3 again. A circulation movement of the grinding bodies thus results between two respective agitator bodies 8.

Collisions between the solids of the grinding material suspension pumped through the grinding chamber 7 and the grinding bodies are caused by the movement of the grinding bodies. These collisions lead to the chip-off of fine particles from the solids in the grinding material suspension, so that the solids arriving at the outlet 6 of the agitator mill 1 are ultimately significantly smaller than the solids fed at the inlet 5.

To ensure that the grinding bodies do not leave the grinding chamber 7, a separating system 4, for example in the form of a screen or of a filter, is also attached upstream of the outlet 6.

In practice, variations of the dimensions of the agitator bodies and/or the position thereof relative to one another have become known, the goal of which is the improved efficiency of an agitator mill.

For instance, grinding disks are proposed in the patent EP2178643B1, which are inclined by angles of from 30° to 60° with respect to the axis of the agitator shaft, and which are thus not approximately perpendicular to the agitator shaft axis. The circulation movement of the grinding bodies is to thus be improved.

The patent DE3431553A1 additionally proposes to lengthen the grinding disks so that the radial distance thereof to the grinding container inner wall is minimized so that it is smaller than the diameter of the used grinding bodies. It is to thus be prevented in particular that individual grinding bodies can be shifted between the central regions, which are in each case formed between two grinding disks.

The mentioned suggestions, however, do not lead to an efficiency increase to a desired extent. On the one hand, the generated circulation movement of the grinding bodies is thus worthy of improvement. On the other hand, the effectively used grinding chamber, which is not occupied by components, is reduced by means of the structural changes of the grinding disks. This has the result that material, which is to be ground less, can be ground simultaneously in the grinding chamber, which tends to negatively impact the efficiency of the agitator mill.

SUMMARY

In view of this, it is the object of the invention to specify a means by which the efficiency of an agitator mill is further increased.

According to the invention, this problem is solved by means of the features of the independent claim.

Such a known agitator mill comprising a grinding chamber containing grinding bodies and an agitator shaft revolving around a horizontal axis in said grinding chamber is thus proposed. The agitator shaft supports several grinding disks, which are connected thereto in a rotationally fixed manner, and which are spaced apart from one another in the direction of the horizontal axis and which can be constructed in one piece or in several pieces. These grinding disks induce a movement of the grinding bodies. In order to be as effective as possible in this respect, the grinding disks generally in each case have grooves and/or continuous slits or apertures, respectively. According to the invention, it is provided that adjacent grinding disks are arranged on the agitator shaft so that the ratio of the grinding chamber length b—measured in the axial direction along the above-mentioned horizontal axis—to the radial grinding chamber height a is greater than or equal to 2:3. This measure takes into account the insight gained as part of systematic simulations that too many grinding disks have been installed again and again for each axial length unit in the case of the current solutions and that the disk distances, which are too small, have reduced the grinding body fluctuation more than was to be expected.

These measures according to the invention take effect together with the further measure that the radial distance c between the outer jacket surface of the grinding disks and the inner wall of the grinding container limiting the grinding chamber is more than 20% of the radial grinding chamber height a. If the grinding disks are not completely cylindrical along their revolving circumferential jacket surface, for instance because they have grooves, slits or flattenings, said ratio is then maintained along the majority of the circumference and ideally along the essentially entire or entire circumference.

During the systematic dimension testing, it turned out that a ratio of the grinding chamber length b to the grinding chamber height a of greater than or equal to 2:3 and the increase of the distance between two grinding disks, which is associated therewith compared to conventional agitator mills, leads to a surprisingly strong intensification of the grinding body fluctuation in the intermediate space between the grinding disks. The increase of the volume of a grinding chamber between two adjacent grinding disks surely makes a causal contribution to this. However, this is not the sole causing effect. This is so because this effect occurs in particular in the combined effect with the profiling of the front sides of the grinding disks by means of grooves, slits or apertures and with the significantly increased radial distance of the grinding disks from the inner surface of the grinding container.

The latter has the result that the grinding body fluctuation increases beyond the grinding disks, which then also intensifies the grinding body fluctuation in the intermediate space between the grinding disks. Due to the fact that an increased friction between the grinding bodies, the inner surface of the grinding chamber and the grinding disks occurs, they are simultaneously also entrained quite a distance further in the circumferential direction before they tilt and fall back into the central region between the two grinding disks limiting the grinding chamber thereof. This results in a synergistic effect: An improved grinding body mobility results in the enlarged grinding chamber between two grinding disks, and an intensified movement is forced upon the grinding bodies, so that they actually do use the newly gained freedom in the grinding chamber.

A further, synergistic improvement in the same sense is attained thereby when the grinding disks have grooves, slits and/or apertures. A once again improved entrainment effect is thus created for the grinding bodies in the circumferential direction. In some cases, however, the grinding bodies additionally also receive an impulse in the direction parallel to the agitator shaft axis of rotation when passing through the grooves, slits, or apertures. As a result, they then move again in the direction of the center of the grinding chamber, which is limited by the two grinding disks, which, as a whole, intensifies the circulation inside the grinding chamber, in particular also transversely or obliquely to the direction of rotation.

The grinding chamber height a is thereby the measurement between the grinding container inner wall limiting the grinding chamber 7 and the largest enclosing diameter of the agitator shaft or of the agitator shaft bushing, which may be attached to the agitator shaft.

The grinding chamber length b is the measurement of the distance between two adjacent grinding disks, wherein the distance of the edges of the side pointing towards the grinding chamber and thus spanning the grinding chamber is used in each case.

There is a number of options for designing the invention so that the effectiveness or usability thereof is improved even further.

DETAILED DESCRIPTION

Figure 1:
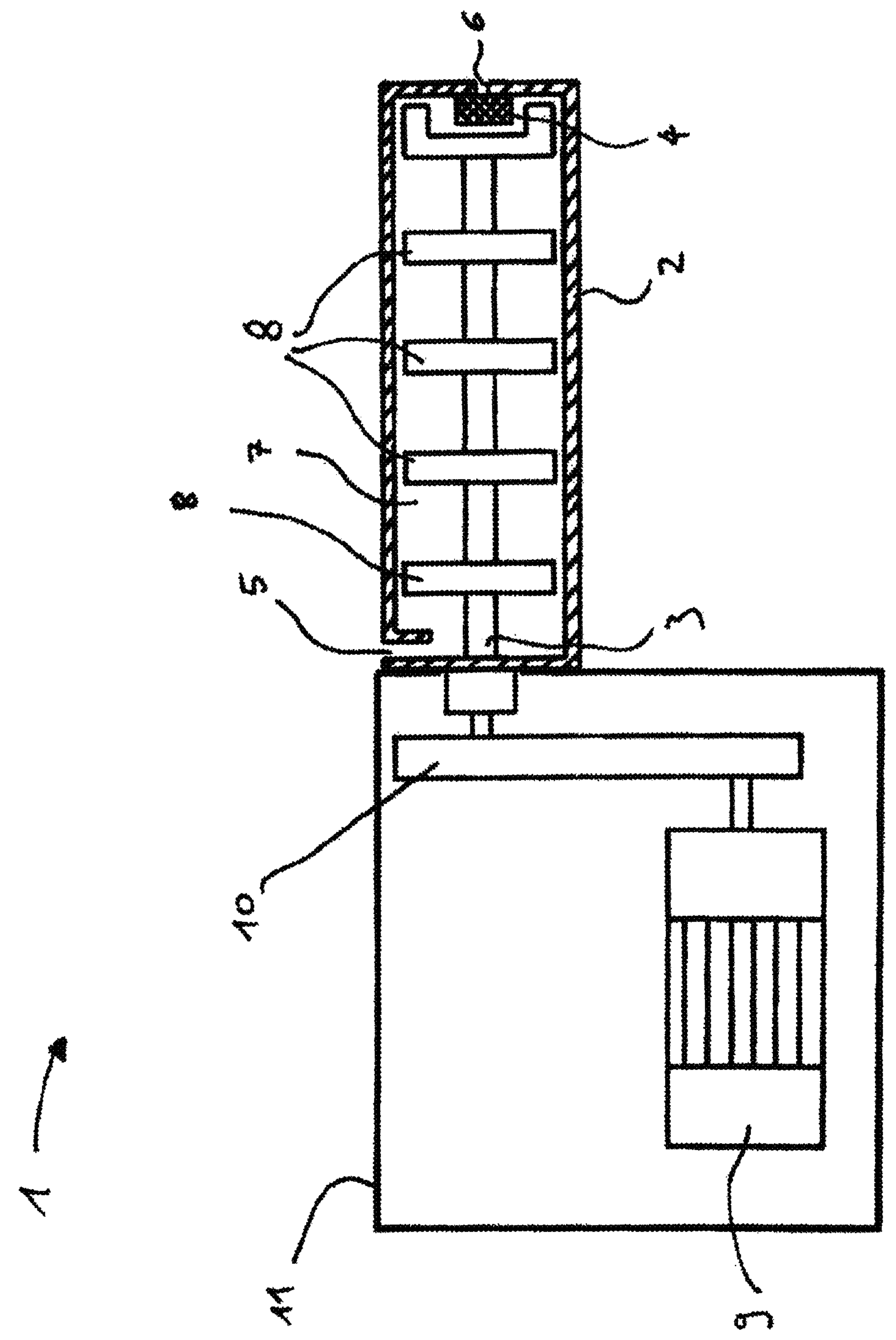
FIG. 1 schematically shows the setup and the connection of a general agitator mill.
Figure 2:
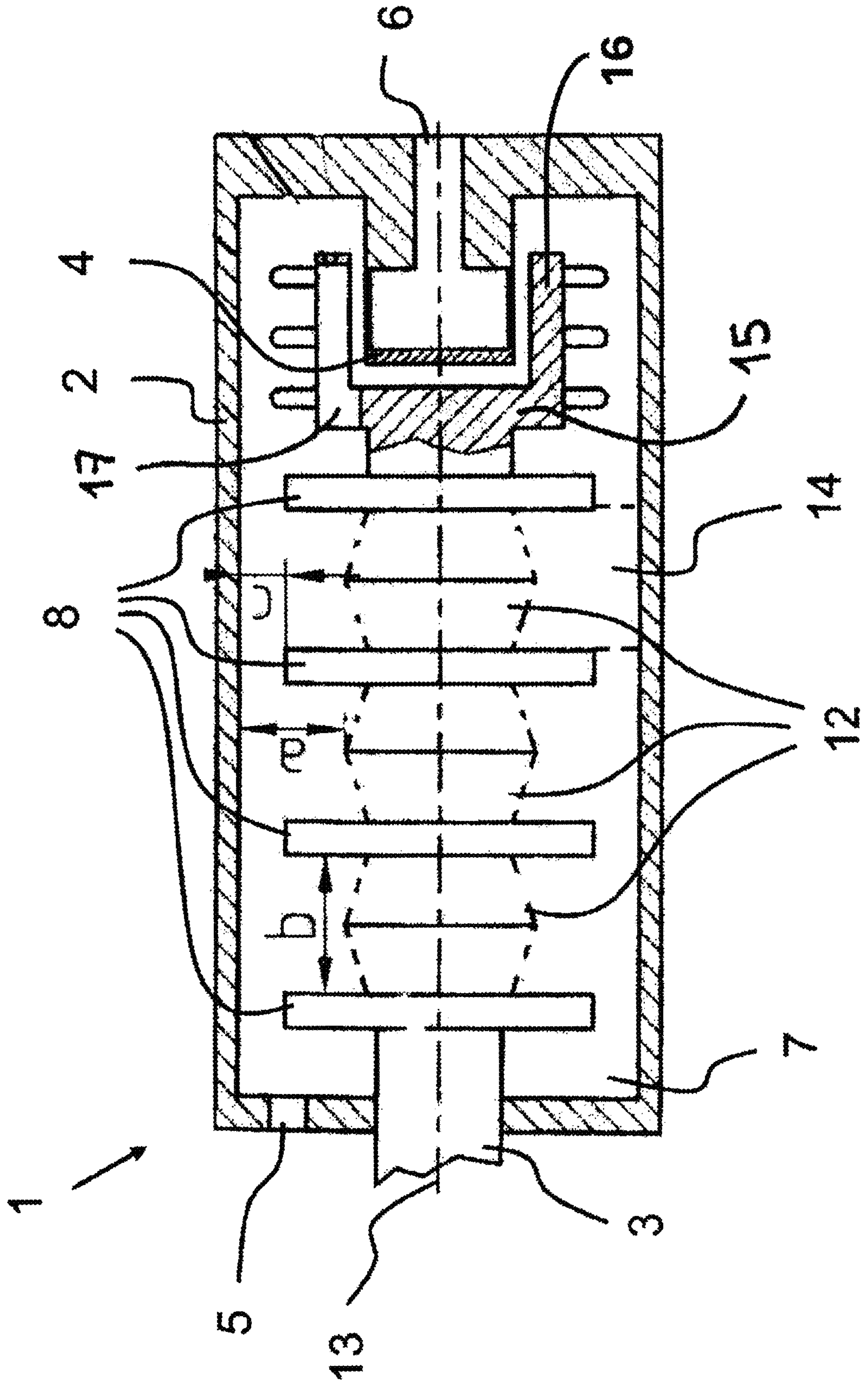
FIG. 2 shows a first alternative of an agitator mill with depicted grinding chamber height a, grinding chamber length b and radial distance c.

FIG. 2 shows a first alternative of the agitator mill 1 comprising agitator shaft bushings 12, which are only illustrated here by means of "dummies", which are not significant, and which are thus suggested in a dotted manner. In addition, the grinding container 2, the agitator shaft 3, the separating system 4, the inlet 5, the outlet 6, the grinding disks 8 and the horizontal axis 13 of the agitator shaft can be seen. The grinding chamber 7 characterizes the complete space, which can be occupied by the material to be ground, in the interior of the grinding container. However, the grinding chamber 14 is thereby a subcategory of the grinding chamber and is depicted by means of dashed lines.

The grinding chamber height a, the grinding chamber length b, and the radial distance c are furthermore depicted.

It can be seen well by means of FIG. 2 that, on its end facing the separating system 4, the agitator shaft forms a rotor disk 15, which limits the actual grinding chamber from the separating system. For this purpose, the rotor disk 15 is equipped with rotor bars 16, which protrude from it—often in a finger-like manner—and which, viewed in the circumferential direction, are spaced apart from one another and form slits between one another. They engage over the separating system 4 and, as a whole, form a quasi cavity, which receives the separating system 4. The rotor disk 15 can advantageously be slit all the way into a slit region 17 radially below the rotor bars, then thus optionally also has an aperture; which extends axially through the rotor disk, radially below the rotor bars 16. This design of the rotor disk comprising the rotor bars 16 is illustrated schematically by means of FIG. 2. This design provides a noticeable further contribution to increasing the grinding body mobility.

Figure 4:
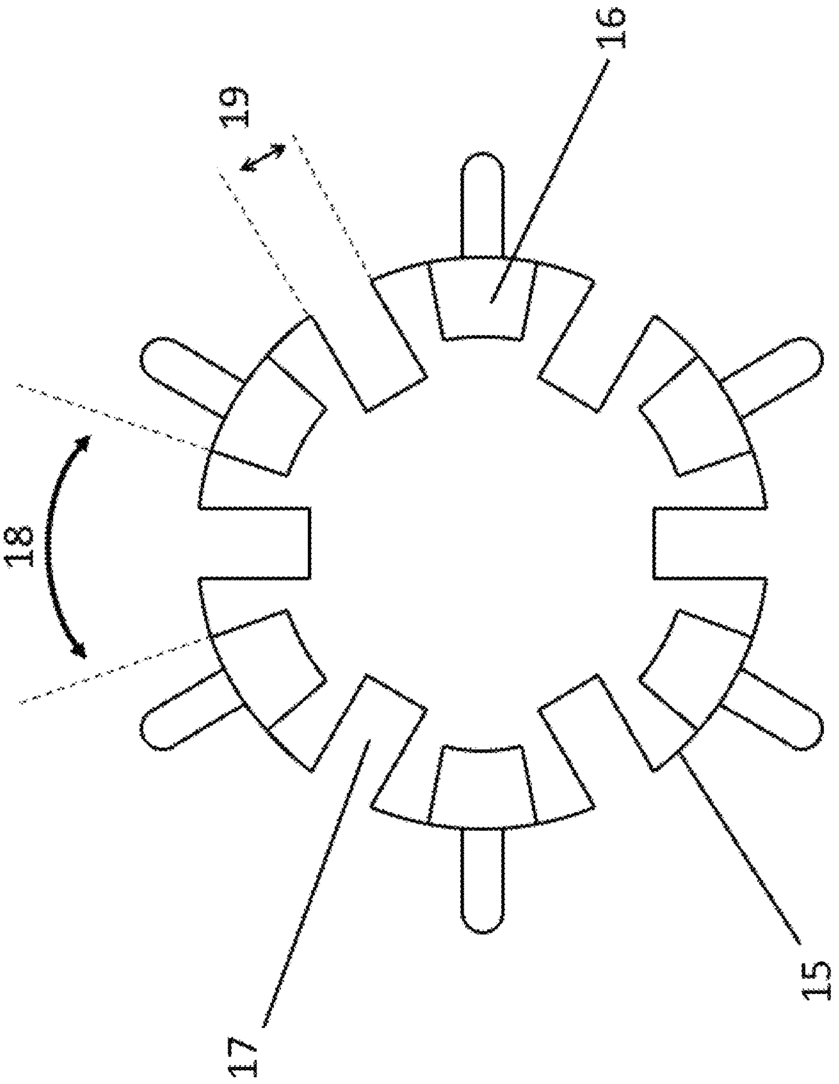
FIG. 4 schematically shows an option for the design of the rotor disk, which limits the grinding chamber 7 with its individual grinding chambers 14 from the separating system 4.

With all this, it can be advantageous when the rotor disk 15 has a smaller diameter than the grinding disks 8 or than the imaginary rotational body of the individual bodies, such as blades or the like, which form the grinding disks. It can be seen well by means of FIG. 4 that the slit area 17 between adjacent rotor bars 16 at a proximal end 19 of the rotor disk 15 is less than the slit area 17 between the adjacent rotor bars 16 at a distal end 18 of the rotor disk 15.

Figure 3:
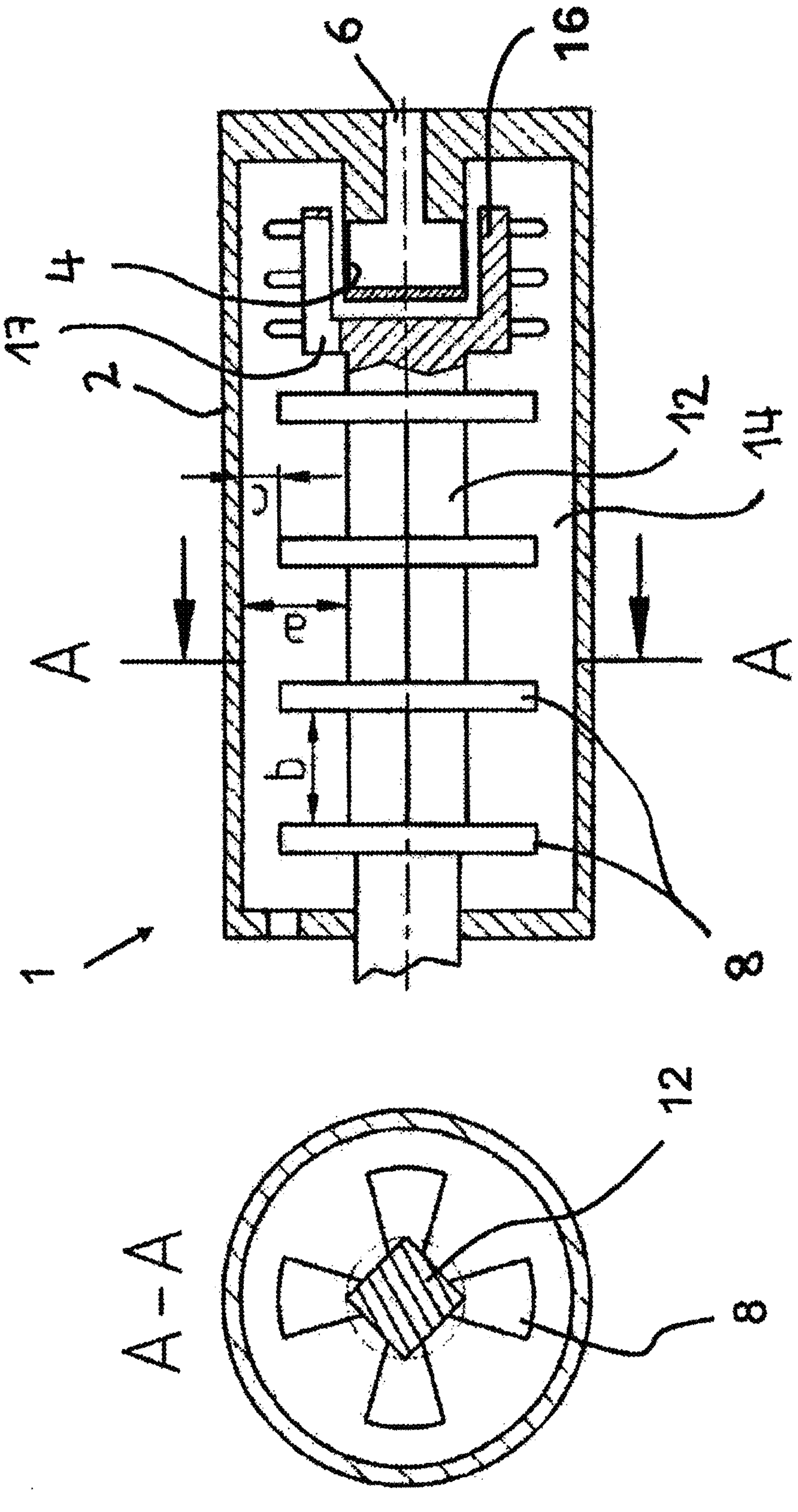
FIG. 3 shows a second alternative of the agitator mill according to the invention with depicted grinding chamber height a, grinding chamber length b, and radial distance c.

FIG. 3 shows a second alternative of the agitator mill 1. Agitator shaft bushings 12 of square shape are used.

The shape of the grinding disk can additionally be recognized on the left in the sectional view. The other setup of the agitator mill corresponds to the setup of the first alternative.

The grinding chamber height a, the grinding chamber length b and the radial distance c are additionally also depicted here.

It can be recognized quite well that each grinding disk consists of several blades, which are arranged one behind the other in the circumferential direction in a rotational alignment and which are separated from one another in the circumferential direction by means of continuous slits. A dimensional matching with the grinding bodies takes place here because the slit size, the size of the grinding bodies and the radial gap distance between the grinding disks and the grinding container inner wall or the grinding container inner circumferential surface, respectively, has to be selected so that the grinding bodies remain mobile in spite of frictional and self-locking forces, and do not block the blades.

The invention claimed is:

1. An agitator mill comprising:

a grinding container limiting a grinding chamber containing grinding bodies and an agitator shaft, which revolves therein around a horizontal axis and has a plurality of grinding disks connected thereto, the grinding disks are spaced apart from one another in a direction of the horizontal axis and cause the grinding bodies to move, wherein each grinding disk has slits or apertures, wherein adjacent ones of the grinding disks are arranged on the agitator shaft so that a ratio of a grinding chamber length to a radial grinding chamber height is greater than or equal to 2:3, and so that a radial distance between an outer jacket surface of the grinding disks and an inner wall of the grinding container is more than 20% of the radial grinding chamber height, wherein the agitator shaft forms a rotor disk on an end of the agitator shaft, the rotor disk comprises rotor bars protruding from the rotor disk in a longitudinal direction of the agitator shaft and forming openings between adjacent ones of the rotor bars, and the rotor disk further comprises recesses in fluid communication with the openings, wherein the recesses are smaller than the openings at least in a circumferential direction of the rotor disk.

2. The agitator mill according to claim 1, wherein the grinding disks have a plurality of blades arranged one behind another in a circumferential direction in a rotational alignment and positioned spaced apart from one another in the circumferential direction.

3. The agitator mill according to claim 1, wherein the end of the agitator shaft faces a separating system, and the rotor disk limits the grinding chamber from the separating system.

4. The agitator mill according to claim 1, wherein the recesses of the rotor disk extend into a region of the rotor disk located radially below the rotor bars.

5. The agitator mill according to claim 2, wherein the end of the agitator shaft faces a separating system, and the rotor disk limits the grinding chamber from the separating system.

* * * * *